(12) United States Patent
Edholm

(10) Patent No.: US 6,772,210 B1
(45) Date of Patent: Aug. 3, 2004

(54) METHOD AND APPARATUS FOR EXCHANGING COMMUNICATIONS BETWEEN TELEPHONE NUMBER BASED DEVICES IN AN INTERNET PROTOCOL ENVIRONMENT

(75) Inventor: Philip K. Edholm, Fremont, CA (US)

(73) Assignee: Nortel Networks Limited (CA)

( * ) Notice: Subject to any disclaimer, the term of this patent is extended or adjusted under 35 U.S.C. 154(b) by 731 days.

(21) Appl. No.: 09/609,964

(22) Filed: Jul. 5, 2000

(51) Int. Cl.[7] .......................................... G06F 15/173
(52) U.S. Cl. ..................... 709/226; 709/227; 709/229; 709/245; 709/249; 370/352; 370/355; 370/401
(58) Field of Search ................................. 709/226–230, 709/238, 242, 244, 245, 249; 370/352–356, 392, 401; 379/93, 142, 219–220.01, 229, 900

(56) References Cited

U.S. PATENT DOCUMENTS

| 5,537,412 | A | * | 7/1996 | Shima et al. ............... 370/401 |
| 5,856,974 | A | * | 1/1999 | Gervais et al. ............. 370/401 |
| 6,185,204 | B1 | * | 2/2001 | Voit ............................ 370/352 |
| 6,307,931 | B1 | * | 10/2001 | Vaudreuil ................... 379/229 |
| 6,381,646 | B2 | * | 4/2002 | Zhang et al. ............... 709/227 |
| 6,400,719 | B1 | * | 6/2002 | Chimura et al. ........ 370/395.31 |
| 6,418,210 | B1 | * | 7/2002 | Sayko .................... 379/142.15 |
| 6,470,010 | B1 | * | 10/2002 | Szviatovszki et al. ...... 370/356 |
| 6,584,094 | B2 | * | 6/2003 | Maroulis et al. ............ 370/352 |

OTHER PUBLICATIONS

Egevang et al., Internet Engineering Task Force (IETF) Request for Comments (RFC) 1631, *The IP Network Address Translator* (May 1994).

* cited by examiner

Primary Examiner—Bharat Barot
(74) Attorney, Agent, or Firm—Steubing McGuinness & Manaras LLP

(57) ABSTRACT

In an IP communication network, telephone number based services, such as Voice-over-IP (VoIP), Fax-over-IP, and IP Paging, are supported using network address translation. A gatekeeper determines a gateway for a connection between a first telephone number based device in a first network and a second telephone number based device in a second network based upon a telephone number for the second telephone number based device. The gateway is situated between the two networks, and enables communication between the two telephone number based devices by having a first address for the first telephone number based device for use in the first network, allocating a second address or address/port number pair for the first telephone number based device for use in the second network, and performing address translation on communication messages exchanged between the first telephone number based device and the second telephone number based device such that the first address for the first telephone number based device is used in the first network and the second address or address/port number pair for the first telephone number based device is used in the second network.

71 Claims, 10 Drawing Sheets

METHOD AND APPARATUS FOR EXCHANGING COMMUNICATIONS BETWEEN TELEPHONE NUMBER BASED DEVICES IN AN INTERNET PROTOCOL ENVIRONMENT

FIELD OF THE INVENTION

The present invention relates generally to communication systems, and more particularly to address management in an Internet Protocol communication network using network address translation for telephone number based services.

BACKGROUND OF THE INVENTION

In today's information age, computers and computer peripherals are often interconnected over a communication network. One type of communication network in general use is an Internet Protocol (IP) network. IP is a connectionless network layer protocol that enables packets of information to be transported based upon a source IP address and a destination IP address contained in the packet.

Probably the most well-known IP network is the Internet. However, various other private and public networks also use IP for internetworking. Such private and public networks may connect to the Internet, for example, through a gateway or other such device.

As the use of IP networks continues to grow, more and more IP-based applications are being developed and deployed. In order to take advantage of certain efficiencies of the IP network, traditional telephone number based communication services, such as telephone (voice), facsimile, and paging, will be implemented over IP networks using IP services.

SUMMARY OF THE INVENTION

In accordance with one aspect of the invention, a gateway situated between a first network and a second network in an IP communication system enables communication between a first telephone number based device in the first network and a second telephone number based device in the second network by having a first address for the first telephone number based device for use in the first network, allocating a second address for the first telephone number based device for use in the second network, and performing address translation on IP communication messages exchanged between the first telephone number based device and the second telephone number based device such that the first address for the first telephone number based device is used in the first network and the second address for the first telephone number based device is used in the second network. The gateway typically allocates the second address from an address pool including a number of addresses that are available for use in the second network. The gateway typically maintains an address translation entry in an address mapping database mapping the first address for the first telephone number based device to the second address for the first telephone number based device, in which case the gateway uses the address translation entry to perform the address translation.

In accordance with another aspect of the invention, a gateway situated between a first network and a second network in a IP communication system enables communication between a first telephone number based device in the first network and a second telephone number based device in the second network by having a first address for the first telephone number based device for use in the first network, allocating a second address and a port number for the first telephone number based device for use in the second network, and performing address translation on IP communication messages exchanged between the first telephone number based device and the second telephone number based device such that the first address for the first telephone number based device is used in the first network and the second address and port number for the first telephone number based device are used in the second network. The gateway typically allocates the second address from an address pool including a number of addresses that are available for use in the second network. The gateway typically maintains an address translation entry in an address mapping database mapping the first address for the first telephone number based device to the second address/port number pair for the first telephone number based device, in which case the gateway uses the address translation entry to perform the address translation.

In a typical embodiment of the invention, the first network is a private network, and the second network is a public network. The first telephone number based device has a private address for use in the private network. The gateway allocates a public address or public address/port number pair for the first telephone number based device for use in the public network, and performs address translation on IP communication messages exchanged between the first telephone number based device and the second telephone number based device such that the private address for the telephone number based device is used in the private network and the public address or public address/port number pair for the first telephone number based device is used in the public network.

In accordance with another aspect of the invention, a gatekeeper determines a gateway for a called device based upon a telephone number for the called device.

In accordance with another aspect of the invention, a telephone number based device in a first network determines a gateway for communicating with a second telephone number based device in a second network, obtains an address for the second telephone number based device for use in the first network, and establishes a connection to the second telephone number based device through the gateway using the second address for the second telephone number based device.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

The present invention provides support for certain telephone number based services, such as telephone (voice), facsimile, and paging, in an IP communication network. For telephone number based services, it is often necessary or desirable for communication devices to communicate across two communication networks that require different network addresses. This requires special address handling, as described herein.

For convenience, various aspects of the present invention are described herein with reference to a Voice-over-IP (VoIP) service. VoIP is an application that enables telephone and other voice-based services to be supported over an IP network.

In a VoIP communication system having a private network connected to a public network (such as the Internet) through a gateway, each VoIP device is associated with a network address. A VoIP device in the private network may be associated with a "private" IP address that is unique within the private network but not within the entire communication system, for example, due to the common practice of reusing IP addresses. Thus, the private IP address may not be usable within the public network for uniquely identifying the VoIP device, in which case the VoIP device cannot establish VoIP connections over the public network using the private IP address.

In an embodiment of the invention, network address translation is used in a communication system to enable a VoIP device or other telephone number based communication device to communicate across two communication networks that require different network addresses. Specifically, a gateway situated between the two networks maps a first address for use in a first network to a second address for use in a second network and performs network address translation in order to translate between the first address and the second address. For example, the gateway may map a private address for use in a private network to a public address for use in a public network and perform network address translation in order to translate between the private address and the public address. The gateway may map a public address to one and only one private address, or the gateway may map multiple private addresses to a single public address, in which case the gateway uses some other mechanism, such as a port number (socket), to distinguish between the various private addresses.

Figure 1:
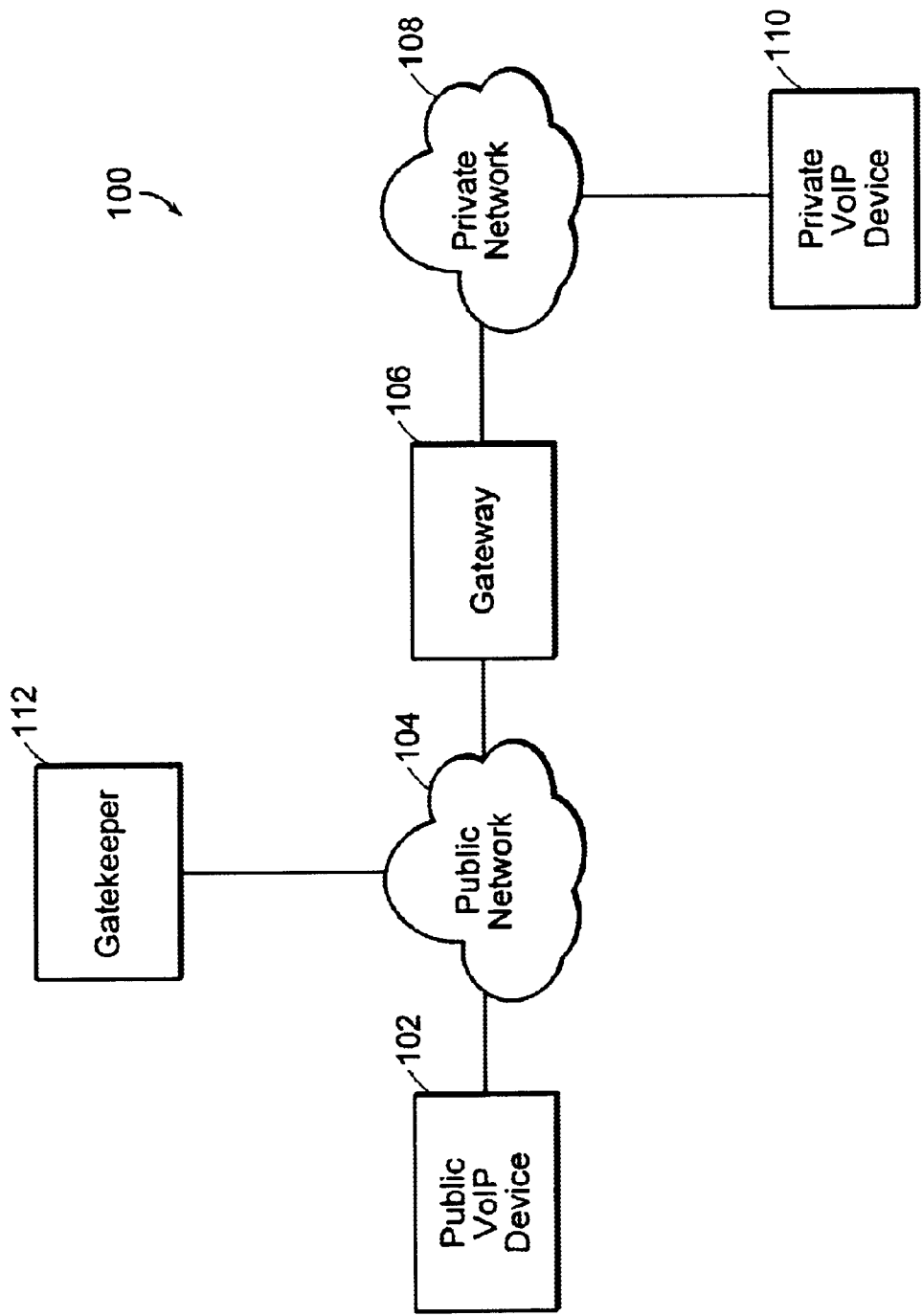
FIG. 1 is a network diagram showing an exemplary VoIP communication system in accordance with an embodiment of the present invention.

FIG. 1 shows an exemplary VoIP communication system 100 in which a VoIP device 102 in a public network 104 (such as the Internet) communicates with a VoIP device 110 in a private network 108 via a gateway 106. In order to distinguish the two VoIP devices, the VoIP device 102 in the public network 104 is referred to hereinafter as the "public" VoIP device, while the VoIP device 110 in the private network 108 is referred to hereinafter as the "private" VoIP device. The communication system 100 also includes a gatekeeper 112 that is coupled to the public network 104.

The public VoIP device 102 is associated with a public address that is unique within the entire communication system 100 and is therefore usable for communicating in both the public network 104 and the private network 108. However, the private VoIP device 112 is associated with a private address that is unique within the private network 108 but not within the entire communication system 100 and is therefore usable only for communicating in the private network 108. Therefore, the public VoIP device 102 and the private VoIP device 110 are unable to communicate directly using their associated addresses.

Therefore, a VoIP connection must be established between the public VoIP device 102 and the private VoIP device 110 before the public VoIP device 102 and the private VoIP device 110 can communicate. Either the public VoIP device 102 or the private VoIP device 110 may initiate the VoIP connection. For convenience, the VoIP device that initiates the VoIP connection may be referred to hereinafter as the "calling" VoIP device, and the VoIP device at which the VoIP connection terminates may be referred to hereinafter as the "called" VoIP device.

In order for a VoIP connection to be established, the calling VoIP device obtains the network address of a gateway (which, in this example, is the gateway 106) as well as a (public) network address or address/port number pair for the called VoIP device, and the gateway 106 creates the appropriate mapping of a private address to a public address or public address/port number.

The calling VoIP device typically obtains the gateway address from the gatekeeper 112, specifically by sending a request to the gatekeeper 112 including a phone number of the called VoIP device. The gatekeeper 112 identifies the gateway for the VoIP connection, for example, based on the area code of the phone number, and returns the gateway address to the calling VoIP device. Alternatively, the calling VoIP device may be configured with the gateway address or may obtain the gateway address in some other manner.

The calling VoIP device typically obtains the (public) network address or address/port number pair for the called VoIP device directly or indirectly from the gateway 106. Specifically, a request may be sent to the gateway 106 requesting the (public) network address for the called VoIP device. The request may be sent by the gatekeeper 112, in which case the gatekeeper 112 obtains the (public) network address for the called VoIP device from the gateway 106 and provides the (public) network address for the called VoIP device to the calling VoIP device, typically along with the gateway address. Alternatively, the request may be sent directly by the calling VoIP device (for example, after receiving the gateway address from the gatekeeper 112), in which case the calling VoIP device obtains the (public) network address for the called VoIP device directly from the gateway 106.

In any case, upon receiving a request for a (public) network address for the called VoIP device, the gateway 106 creates the appropriate mapping of a private address to a public address or public address/port number, and returns the (public) network address or address/port number pair for the called VoIP device. Specifically, whether the VoIP connection is initiated by the public VoIP device 102 or the private VoIP device 110, the gateway 106 dynamically allocates a public address for the private VoIP device 110, for example, from a pool (list) of available public addresses. If the gateway 106 permits multiple private addresses to be mapped to a single public address, then the gateway 106 may also select a port number (socket) for the private VoIP device 110. The gateway 106 maps the private address of the private VoIP device 110 to the public address or public address/port number pair, for example, in an address mapping database. The gateway 106 returns the (public) network address for the called VoIP device, which is either the dynamically allocated public address or public address/port number pair, if the public VoIP device 102 is the calling VoIP device, or the public address of the public VoIP device 102, if the private VoIP device 110 is the calling VoIP device.

Figure 2A:
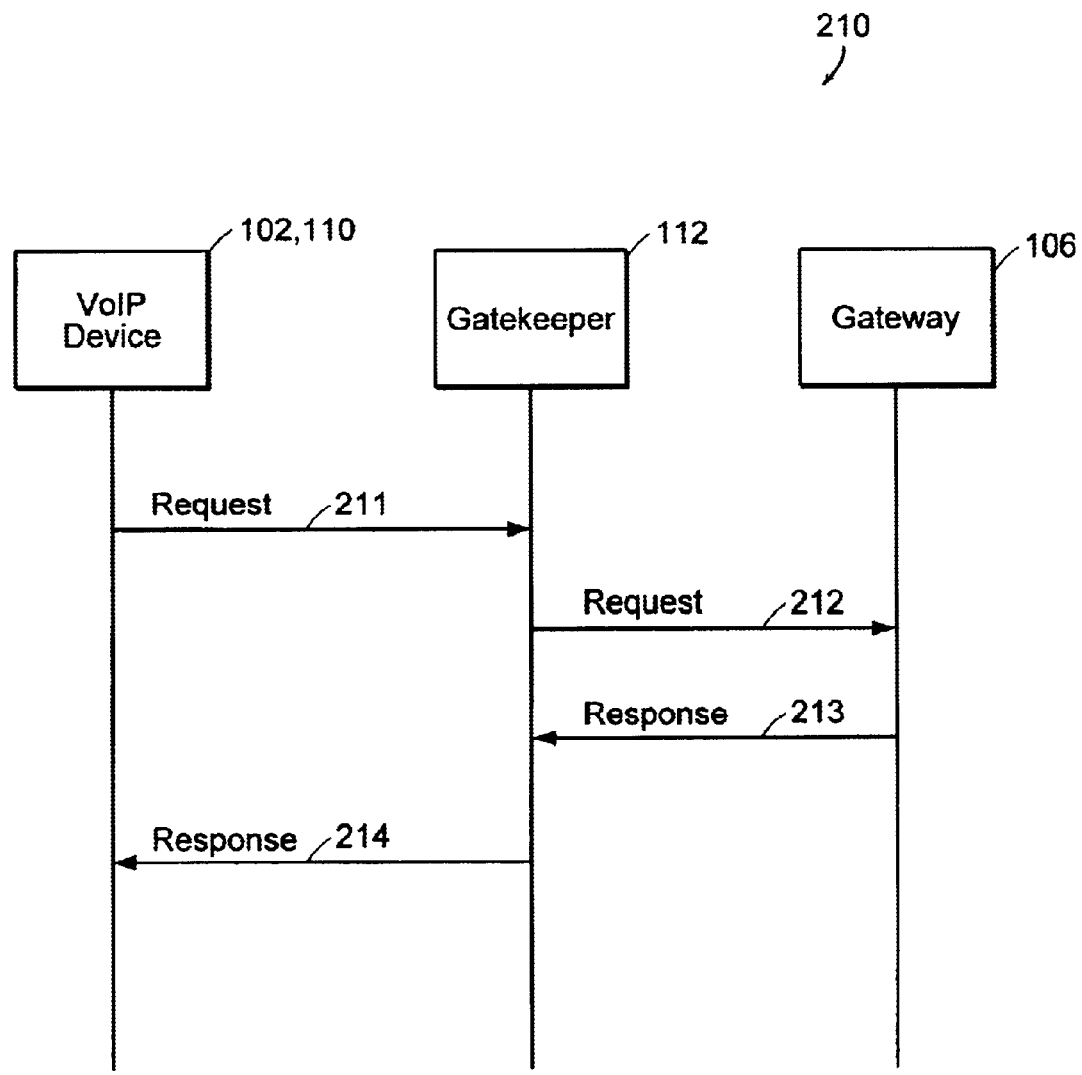
FIG. 2A is a message flow diagram showing a first exemplary message flow among and between the calling VoIP device, the gatekeeper, and gateway for establishing a VoIP connection in accordance with an embodiment of the present invention.

FIG. 2A is a message flow diagram showing a first exemplary message flow 210 among and between the calling VoIP device (102, 110), the gatekeeper 112, and gateway 106 for establishing a VoIP connection. The calling VoIP device (102, 110) initiates the VoIP connection by sending a request 211 to the gatekeeper 112 including the phone number for the called VoIP device.

Upon receiving the request 211 from the calling VoIP device (102, 110), the gatekeeper 112 determines the gateway for the VoIP connection (which, in this example, is the gateway 106), for example, based upon the area code of the phone number. The gatekeeper 112 then sends a request 212 to the gateway 106 requesting a (public) network address for the called VoIP device.

Upon receiving the request 212 from the gatekeeper 112, the gateway 106 dynamically allocates a public address or public address/port number pair for the private VoIP device 110 and creates the appropriate mapping between the private address for the private VoIP device 110 and the corresponding public address or public address/port number pair. The gateway 106 also determines the called VoIP device, and determines the (public) network address or address/port number pair for the called VoIP device, which is either the dynamically allocated public address or public address/port number pair, if the public VoIP device 102 is the calling VoIP device, or the public address of the public VoIP device 102, if the private VoIP device 110 is the calling VoIP device. The gateway 106 then sends a response 213 to the gatekeeper 112 including the (public) network address or address/port number pair for the called VoIP device.

Upon receiving the response 213 from the gateway 106, the gatekeeper 112 sends a response 214 to the calling VoIP device (102, 110) including the gateway address and the (public) network address or address/port number pair for the called VoIP device.

Figure 2B:
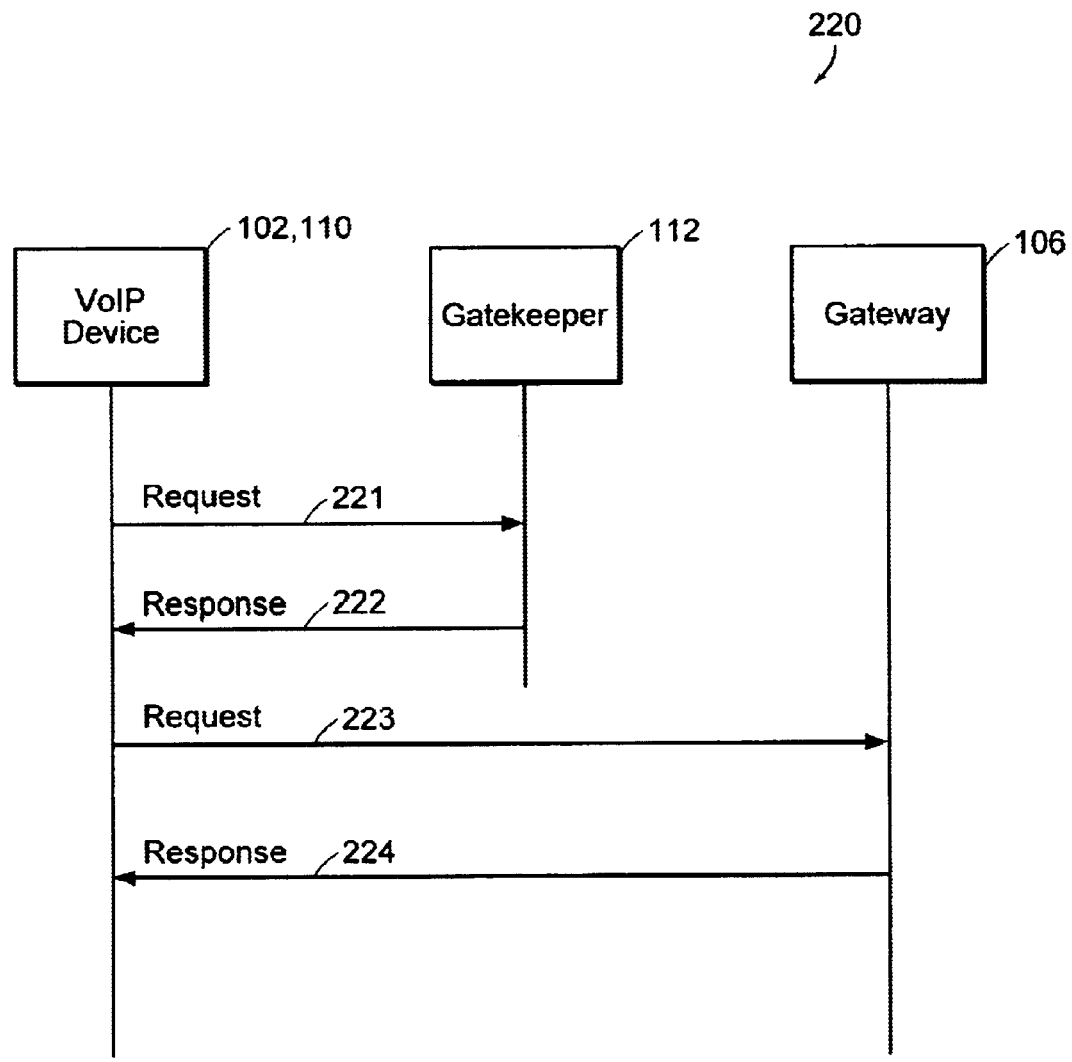
FIG. 2B is a message flow diagram showing a second exemplary message flow among and between the calling VoIP device, the gatekeeper, and gateway for establishing a VoIP connection in accordance with an embodiment of the present invention.

FIG. 2B is a message flow diagram showing a second exemplary message flow 220 among and between a VoIP device (102, 110), the gatekeeper 112, and gateway 106 for establishing a VoIP connection. The calling VoIP device (102, 110) initiates the VoIP connection by sending a request 221 to the gatekeeper 112 including the phone number for the called VoIP device.

Upon receiving the request 221 from the calling VoIP device (102, 110), the gatekeeper 112 determines the gateway for the VoIP connection (which, in this example, is the gateway 106), for example, based upon the area code of the phone number. The gatekeeper 112 then sends a response 222 to the calling VoIP device (102, 110) including the gateway address.

Upon receiving the response 222 from the gatekeeper 112, the calling VoIP device (102, 110) sends a request 223 to the gateway 106 requesting a (public) network address for the called VoIP device.

Upon receiving the request 223 from the calling VoIP device (102, 110), the gateway 106 dynamically allocates a public address or public address/port number pair for the private VoIP device 110 and creates the appropriate mapping between the private address for the private VoIP device 110 and the corresponding public address or public address/port number pair. The gateway 106 also determines the called VoIP device, and determines the (public) network address or address/port number pair for the called VoIP device, which is either the dynamically allocated public address or public address/port number pair, if the public VoIP device 102 is the calling VoIP device, or the public address of the public VoIP device 102, if the private VoIP device 110 is the calling VoIP device. The gateway 106 then sends a response 224 to the calling VoIP device (102, 110) including the (public) network address or address/port number pair for the called VoIP device.

Figure 3:
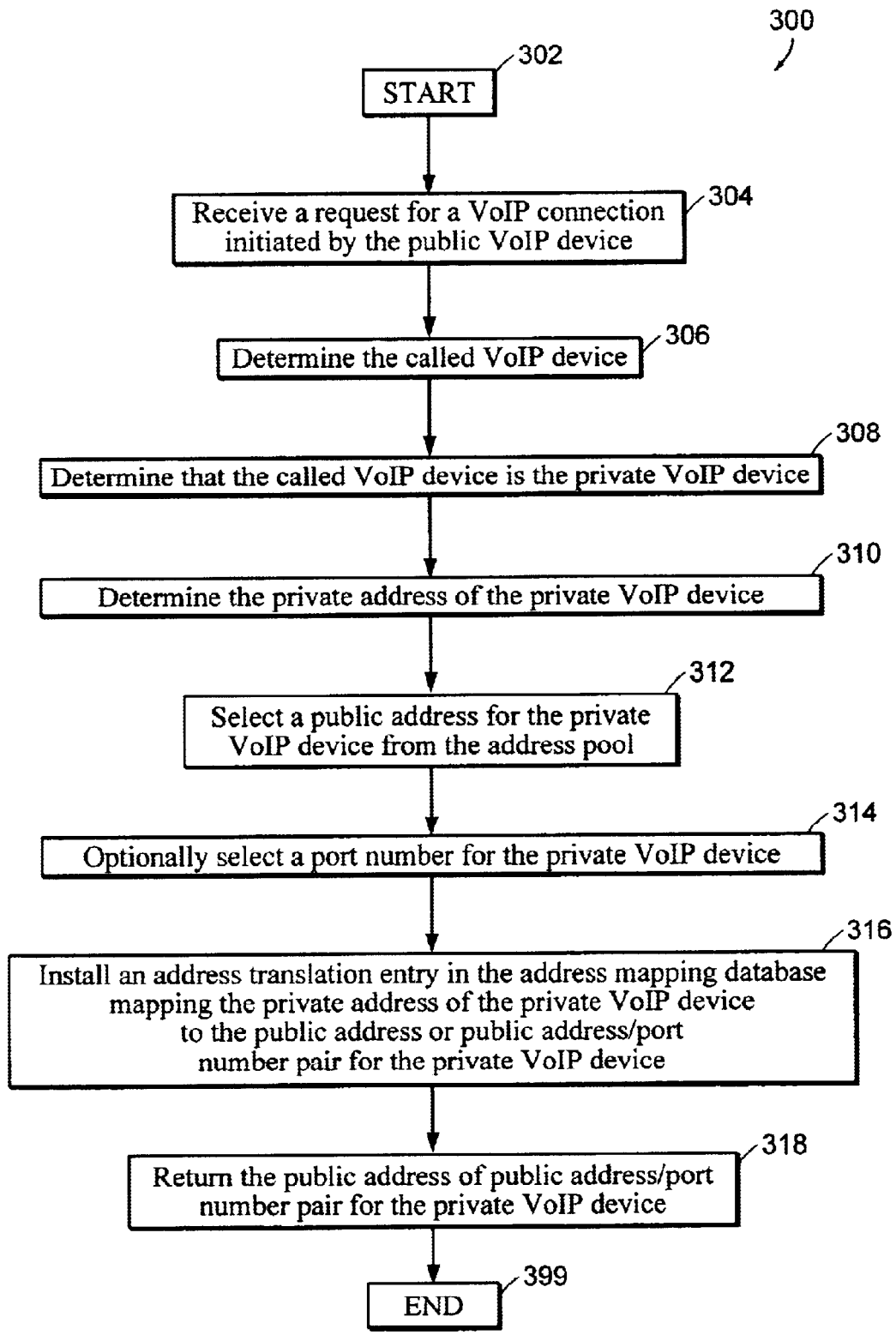
FIG. 3 is a logic flow diagram showing exemplary logic for establishing the VoIP connection by the gateway when the VoIP connection is initiated by the public VoIP device in accordance with an embodiment of the present invention.

FIG. 3 is a logic flow diagram showing exemplary logic 300 for establishing the VoIP connection by the gateway 106 when the VoIP connection is initiated by the public VoIP device 102. Beginning at block 302, and upon receiving a request for a VoIP connection initiated by the public VoIP device 102, in block 304, the logic determines the called VoIP device, in block 306, for example, based upon the phone number of the called VoIP device. Upon determining that the called VoIP device is the private VoIP device 110, in block 308, the logic determines the private address of the private VoIP device 110, in block 310, for example, based upon address mapping information contained in an address mapping database. The logic selects a public address for the private VoIP device 110 from an address pool, in block 312, and optionally selects a port number (socket) for the private VoIP device 110, in block 314. The logic installs an address translation entry in the address mapping database mapping the private address of the private VoIP device 110 to the public address or public address/port number pair for the private VoIP device 110, in block 316. The logic returns the public address or public address/port number pair for the private VoIP device, in block 318. The logic 300 terminates in block 399.

Figure 4:
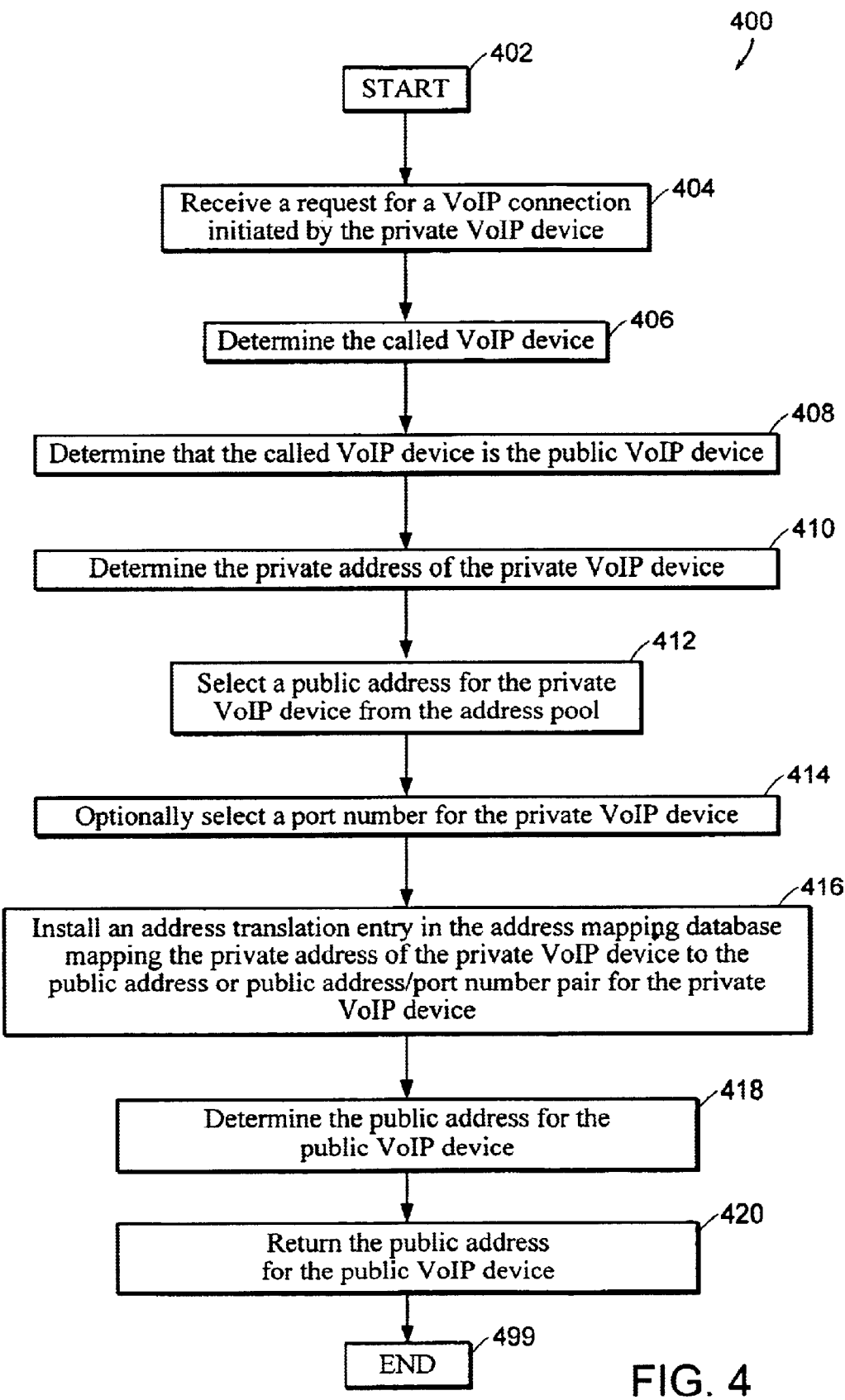
FIG. 4 is a logic flow diagram showing exemplary logic for establishing the VoIP connection by the gateway when the VoIP connection is initiated by the private VoIP device.

FIG. 4 is a logic flow diagram showing exemplary logic 400 for establishing the VoIP connection by the gateway 106 when the VoIP connection is initiated by the private VoIP device 110. Beginning at block 402, and upon receiving a request for a VoIP connection initiated by the private VoIP device 110, in block 404, the logic determines the called VoIP device, in block 406, for example, based upon the phone number of the called VoIP device. Upon determining that the called VoIP device is the public VoIP device 102, in block 408, the logic determines the private address of the private VoIP device 110, in block 410, for example, based upon address mapping information contained in an address mapping database. The logic selects a public address for the private VoIP device 110 from an address pool, in block 412, and optionally selects a port number (socket) for the private VoIP device 110, in block 414. The logic installs an address translation entry in the address mapping database mapping the private address of the private VoIP device 110 to the public address or public address/port number pair for the private VoIP device 110, in block 416. The logic determines the public address for the public VoIP device 102, in block 418, for example, based upon address mapping information contained in an address mapping database. The logic returns the public address for the public VoIP device, in block 420. The logic 400 terminates in block 499.

Once the VoIP connection is established between the public VoIP device 102 and the private VoIP device 110, the public VoIP device 102 and the private VoIP device are able to exchange packets over the VoIP connection. However, in order for the public VoIP device 102 and the private VoIP device to exchange packets, the gateway 106 performs network address translation on the packets exchanged between the public VoIP device 102 and the private VoIP device 110 in order to translate between the private address and the public address or public address/port number pair for the private VoIP device 110. In this way, the public VoIP device 102 and the private VoIP device 110 are able to communicate over the Void connection.

When the public VoIP device 102 sends a packet destined for the private VoIP device 110, the public VoIP device 102 typically includes destination addressing information in the packet that is set to the public address or public address/port number for the private VoIP device 110. Upon receiving the packet from the public VoIP device 102, the gateway 106 forwards a translated packet to the private VoIP device 110 over the private network 108 including destination addressing information set to the private address for the private VoIP device 110. Specifically, upon receiving the packet from the public VoIP device 102, the gateway 106 finds the address translation entry in the address mapping database that maps the public address or public address/port number to the corresponding private address, and translates the destination addressing information from the public address or public address/port number to the corresponding private address. The gateway 106 forwards the resulting translated packet to the private VoIP device 110 over the private network 108.

When the private VoIP device 110 sends a packet destined for the public VoIP device 102, the private VoIP device 110 typically includes source addressing information in the packet that is set to the private address for the private VoIP device 110. Upon receiving the packet from the private VoIP device 110, the gateway 106 forwards a translated packet to the public VoIP device 102 over the public network 104 including source addressing information set to the public address or public address/port number for the private VoIP device 110. Specifically, upon receiving the packet from the private VoIP device 110, the gateway 106 finds the address translation entry in the address mapping database that maps the private address to the corresponding public address or public address/port number, and translates the source addressing information from the private address to the corresponding public address or public address/port number. The gateway 106 forwards the resulting translated packet to the public VoIP device 102 over the public network 104.

Figure 8:
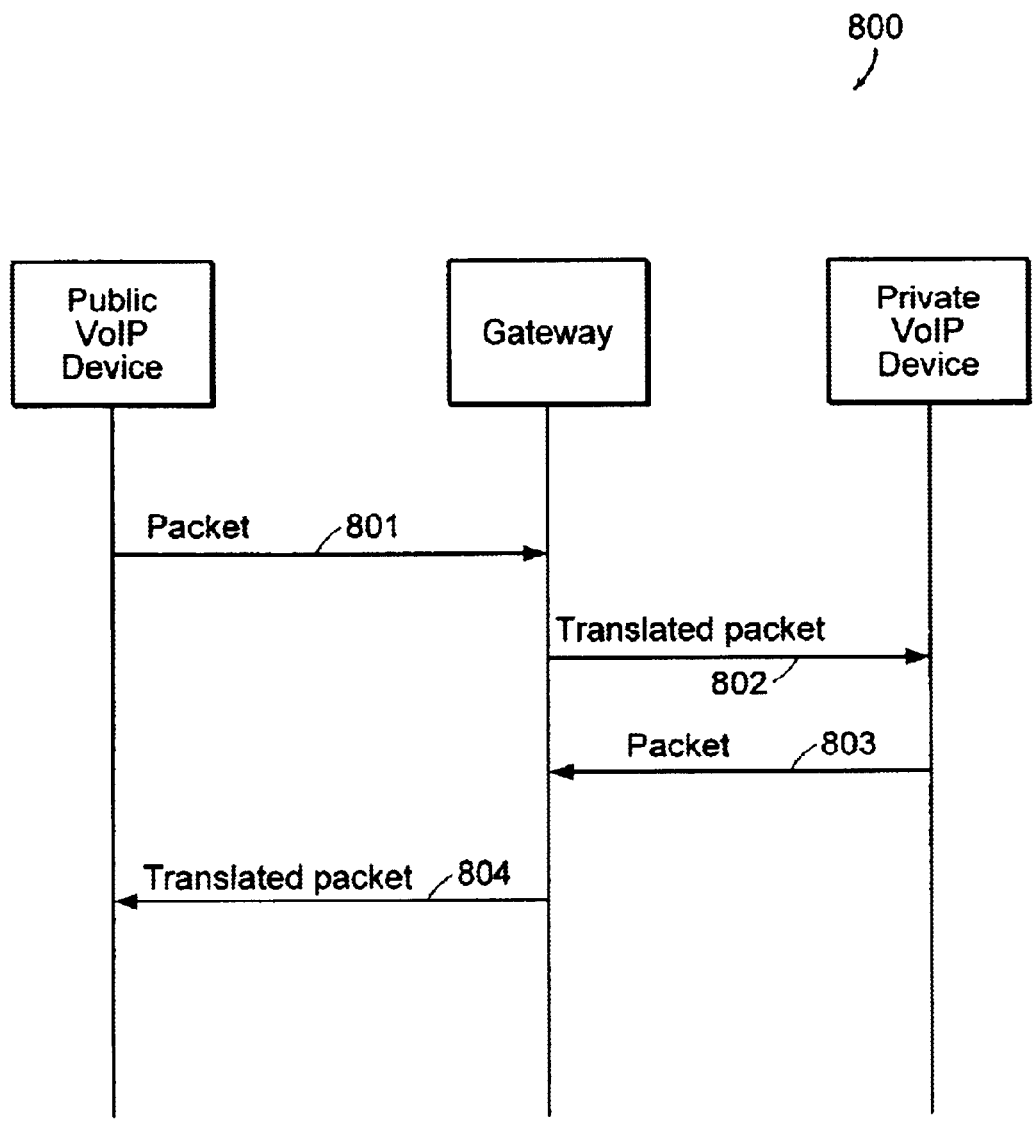
FIG. 8 is a message flow diagram showing an exemplary message flow among and between the public VoIP device, the gateway, and the private VoIP device in accordance with an embodiment of the present invention.

FIG. 8 is a message flow diagram showing an exemplary message flow 800 among and between the public VoIP device 102, the gateway 106, and the private VoIP device 110. When the public VoIP device 102 sends a packet 801 destined for the private VoIP device 110, the gateway 106 forwards a translated packet 802 to the private VoIP device 110 over the private network 108. The translated packet 802 includes destination addressing information set to the private address for the private VoIP device 110. When the private VoIP device 110 sends a packet 803 destined for the public VoIP device 102, the gateway 106 forwards a translated packet 804 to the public VoIP device 102 over the public network 104. The translated packet 804 includes source addressing information set to the public address or public address/port number for the private VoIP device 110.

Figure 5:
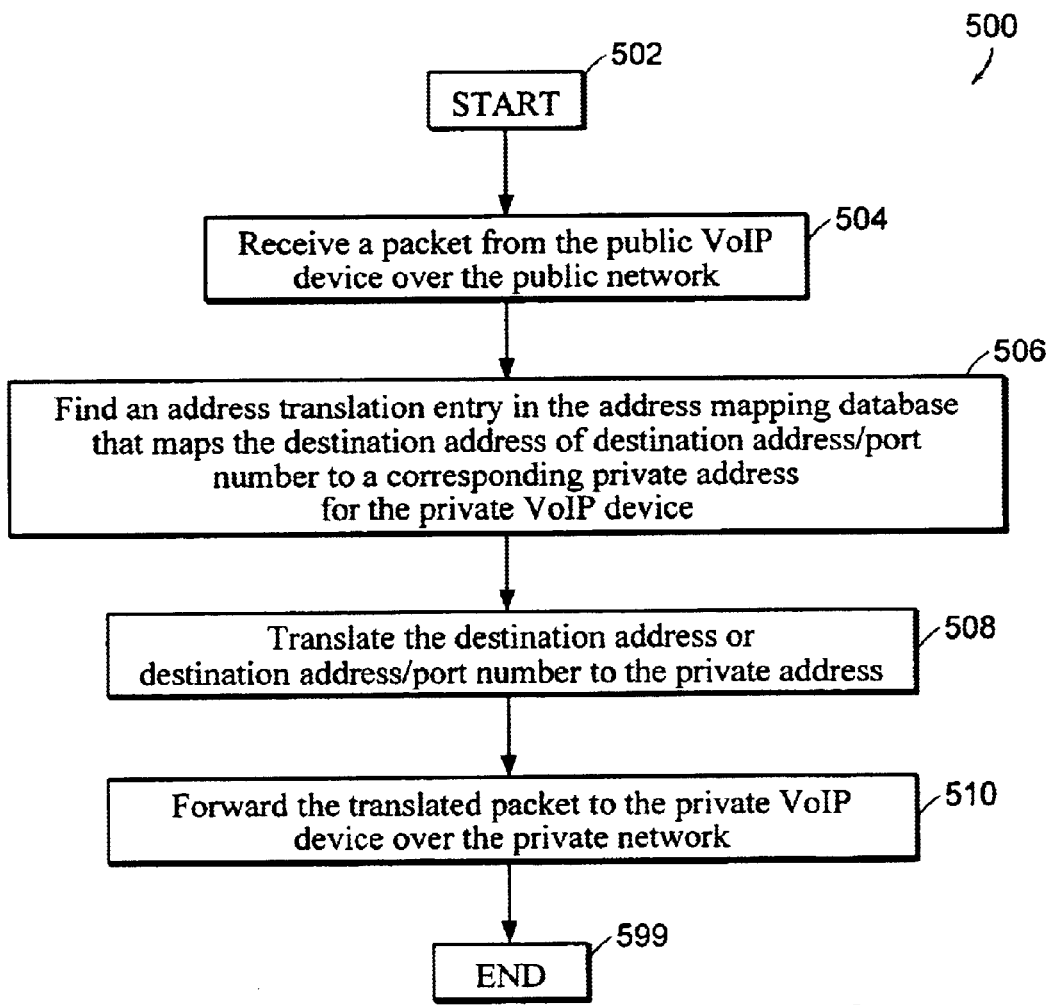
FIG. 5 is a logic flow diagram showing exemplary logic for translating a packet by the gateway when the packet is received from the public VoIP device over the public network in accordance with an embodiment of the present invention.

FIG. 5 is a logic flow diagram showing exemplary logic 500 for translating a packet by the gateway 106 when the packet is received from the public VoIP device 102 over the public network 104. Beginning at block 502, and upon receiving a packet from the public VoIP device 102 over the public network 104, the logic finds an address translation entry in the address mapping database that maps the destination address or destination address/port number to a corresponding private address for the private VoIP device 110, in block 506, and translates the destination address or destination address/port number to the private address, in block 508. The logic forwards the translated packet to the private VoIP device 110 over the private network 104, in block 510. The logic 500 terminates in block 599.

Figure 6:
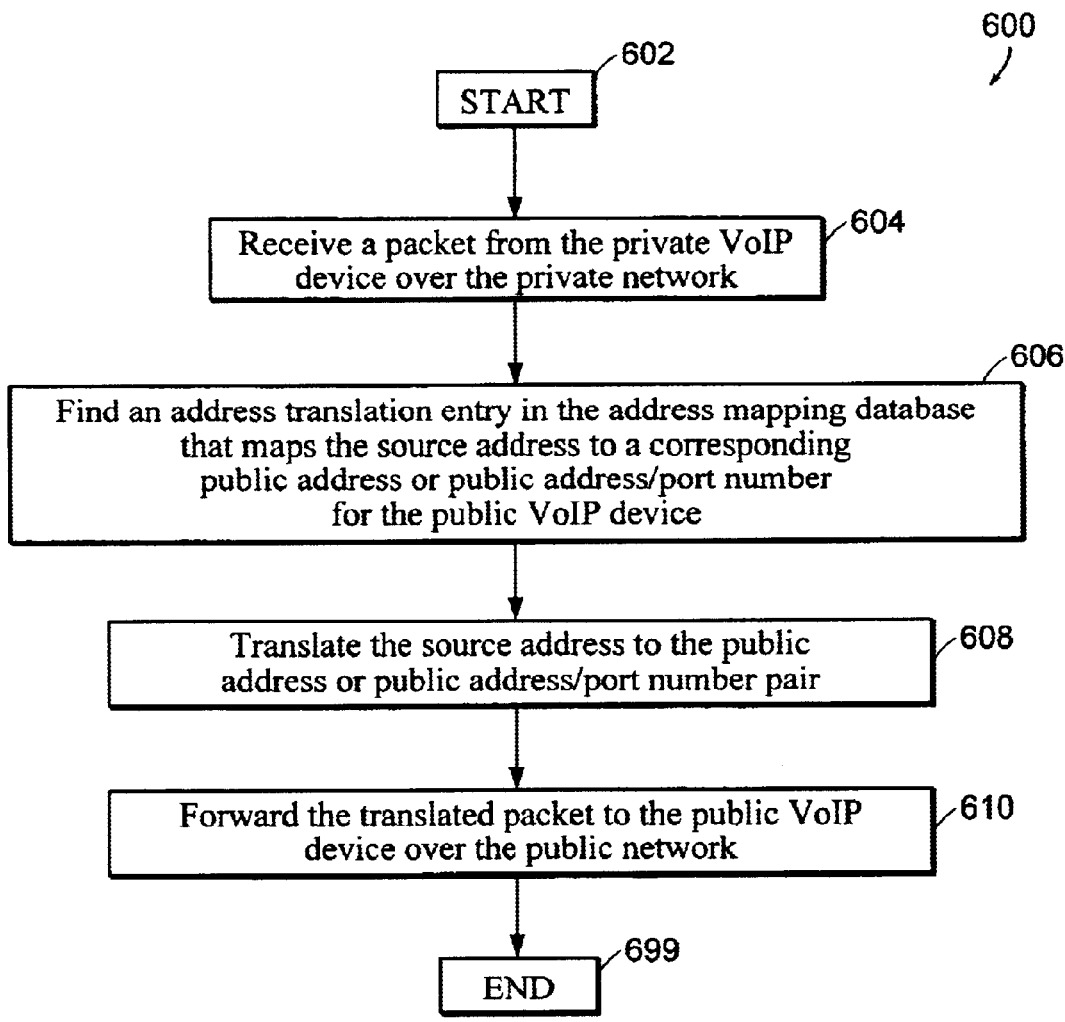
FIG. 6 is a logic flow diagram showing exemplary logic for translating a packet by the gateway when the packet is received from the private VoIP device over the private network in accordance with an embodiment of the present invention.

FIG. 6 is a logic flow diagram showing exemplary logic 600 for translating a packet by the gateway 106 when the packet is received from the private VoIP device 110 over the private network 108. Beginning at block 602, and upon receiving a packet from the private VoIP device 110 over the private network 108, the logic finds an address translation entry in the address mapping database that maps the source address to a corresponding public address or public address/port number for the private VoIP device 110, in block 606, and translates the source address to the public address or public address/port number, in block 608. The logic forwards the translated packet to the public VoIP device 102 over the public network 108, in block 610. The logic 600 terminates in block 699.

Figure 7:
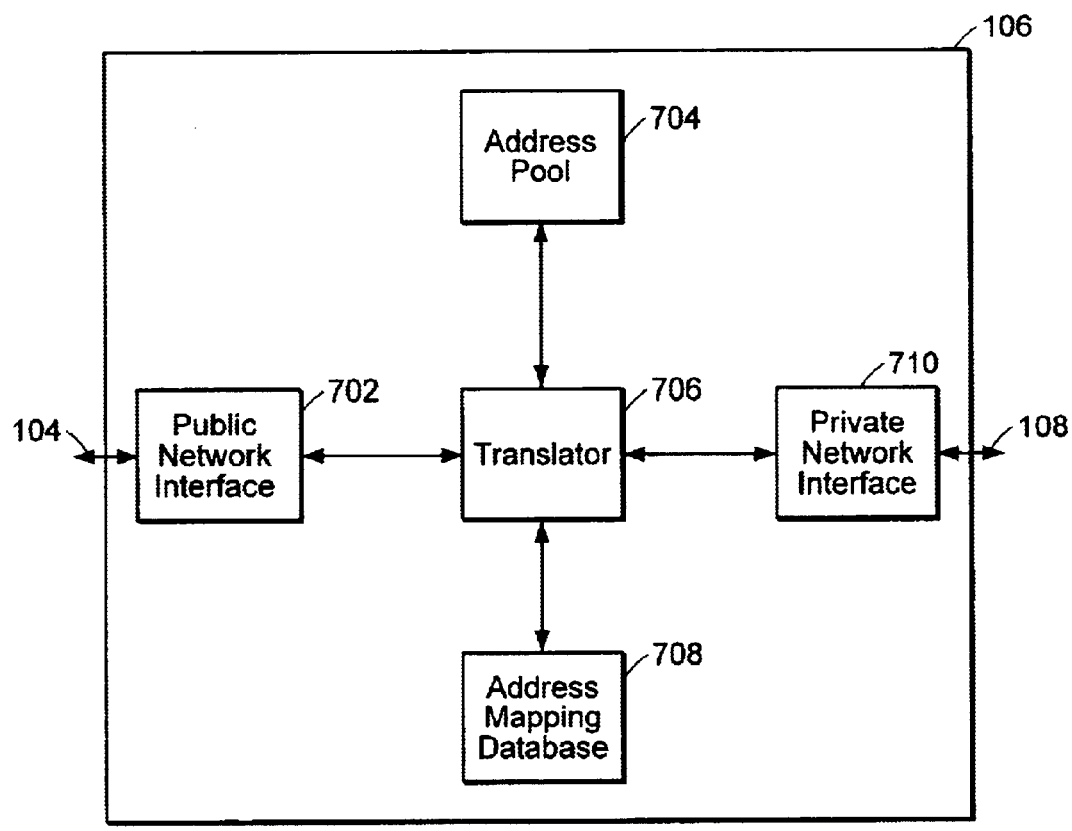
FIG. 7 is a block diagram showing the relevant logic blocks of an exemplary gateway in accordance with an embodiment of the present invention.

FIG. 7 is a block diagram showing the relevant logic blocks of the gateway 106. The gateway 106 includes, among other things, public network interface 702, an address pool 704, a translator 706, an address mapping database 708, and private network interface 710. The public network interface 702 is couplable to the public network 104, and enables the gateway 106 to send and receive VoIP packets over the public network 104. The private network interface 710 is couplable to the private network 108, and enables the gateway106 to send and receive VoIP packets over the private network 108. The translator 706, which is interposed between the public network interface 702 and the private network interface 710, dynamically allocates the public address or public address/port number pair for the private VoIP device 110, creates the address translation entry in the address mapping database 708 that maps the private address to the public address or public address/port number pair during the VoIP connection establishment procedure, and performs network address translation for packets exchanged between the public VoIP device 102 and the private VoIP device 110.

When the gateway 106 receives a request for a (public) network address for a called VoIP device as part of the VoIP connection establishment procedure, the translator 706 dynamically allocates a public address for the private VoIP device 110 from the address pool 704. If the translator 706 permits multiple private addresses to be mapped to a single public address, then the translator 706 may also select a port number (socket) for the private VoIP device 110. The translator 706 installs an address translation entry in the address mapping database 708 that maps the private address of the private VoIP device 110 to the public address or public address/port number pair. The translator 706 returns the (public) network address for the called VoIP device, which is either the dynamically allocated public address or public address/port number pair, if the public VoIP device 102 is the calling VoIP device, or the public address of the public VoIP device 102, if the private VoIP device 110 is the calling VoIP device.

When the gateway 106 receives a packet from the public VoIP device 102 over the public network interface 702, the translator 706 finds the address translation entry in the address mapping database 708 that maps the public address or public address/port number to the corresponding private address, and translates the destination addressing information from the public address or public address/port number to the corresponding private address. The translator 706 forwards the resulting translated packet to the private VoIP device 110 over the private network interface 710.

When the gateway 106 receives a packet from the private VoIP device 110 over the private network interface 710, the translator 706 finds the address translation entry in the address mapping database 708 that maps the private address to the corresponding public addressor public address/port number, and translates the source addressing information from the private address to the corresponding public address or public address/port number. The translator 706 forwards the resulting translated packet to the public VoIP device 102 over the public network interface 702.

Figure 9:
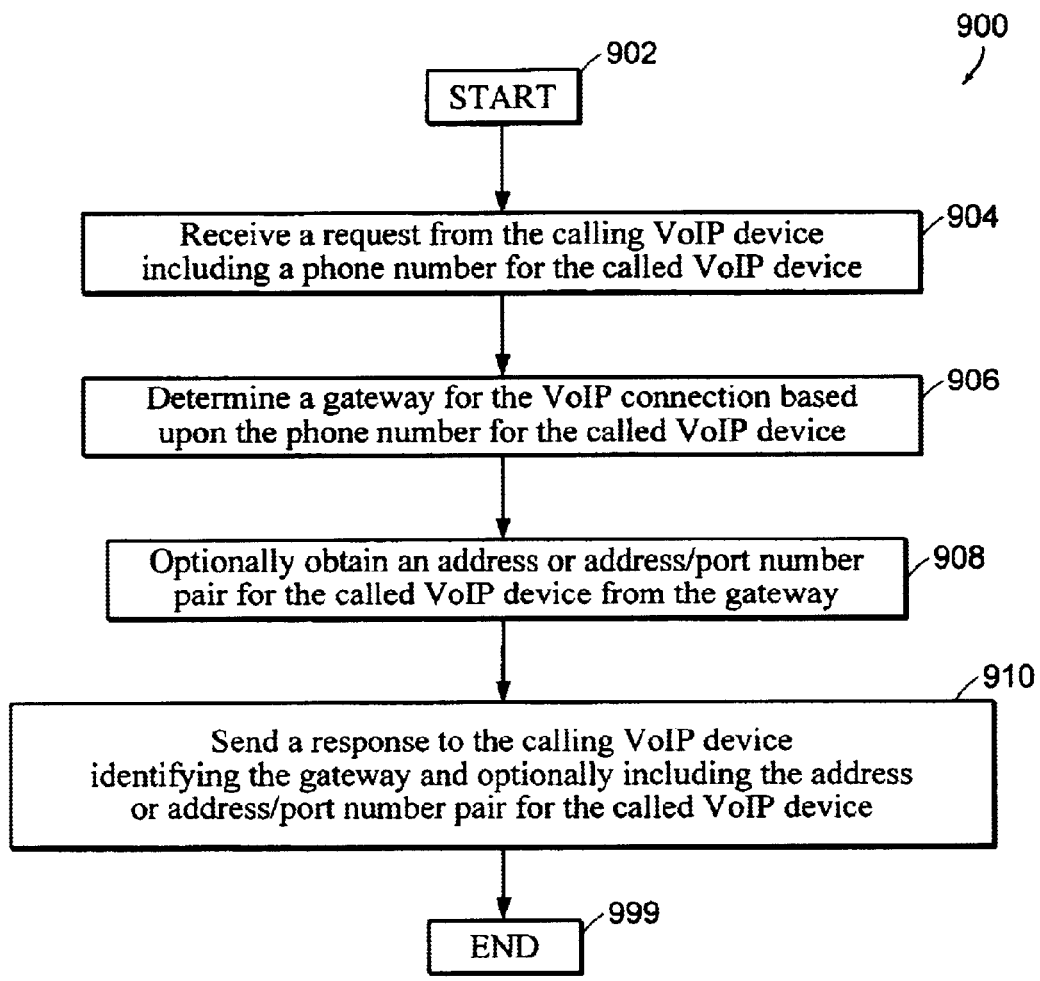
FIG. 9 is a logic flow diagram showing exemplary gatekeeper logic in accordance with an embodiment of the present invention.

FIG. 9 is a logic flow diagram showing exemplary gatekeeper logic 900. Beginning at block 902, and upon receiving a request from the calling VoIP device including a phone number for the called VoIP device, in block 904, the logic determines a gateway for the VoIP connection based upon the phone number for the called VoIP device, in block 906, for example, based upon the area code of the phone number. The logic optionally obtains an address or address/port number pair for the called VoIP device from the gateway, in block 908. The logic sends a response to the calling VoIP device identifying the gateway and optionally including the address or address/port number pair for the called VoIP device, in block 910. The logic 900 terminates in block 999.

It should be noted that terms such as "gatekeeper" and "gateway" are used herein to describe various communication devices that may be used in a communication system, and should not be construed to limit the present invention to any particular communication device type. Thus, a communication device may include, without limitation, a gatekeeper, gateway, bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor within the appropriate device (gatekeeper, gateway, telephone number based device) under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

I claim:

1. In an Internet Protocol (IP) communication system having a first network coupled to a second network through a gateway, wherein the first network and the second network are both IP networks, a method for exchanging communication messages between a first telephone number based device in the first network and a second telephone number based device in the second network, the first telephone number based device having a first address for use in the first network, the method comprising:

allocating a second address for the first telephone number based device for use in the second network; and performing address translation on communication messages so that the first address for the first telephone number based device is used in the first network and the second address for the first telephone number based device is used in the second network.

2. The method of claim 1, wherein allocating the second address for the first telephone number based device for use in the second network comprises:

maintaining an address pool including a number of addresses available for use in the second network; and selecting the second address from among the number of addresses in the address pool.

3. The method of claim 1, further comprising:

installing an address translation entry in an address mapping database, the address translation entry mapping the first address for the first telephone number based device to the second address for the first telephone number based device.

4. The method of claim 1, wherein performing address translation on communication messages so that the first address for the first telephone number based device is used in the first network and the second address for the first telephone number based device is used in the second network comprises:

receiving a first communication message including the first address for the fist telephone number based device; and forwarding a second communication message including the second address for the first telephone number based device.

5. The method of claim 1, wherein performing address translation on communication messages so that the first address for the first telephone number based device is used in the first network and the second address for the first telephone number based device is used in the second network comprises:

receiving a first communication message including the second address for the first telephone number based device; and forwarding a second communication message including the first address for the first telephone number based device.

6. The method of claim 1, further comprising:

allocating a port number for the first device for use in the second network.

7. The method of claim 6, further comprising:

installing an address translation entry in an address mapping database, the address translation entry mapping the first address for the first telephone number based device to the second address and the port number for the first telephone number based device.

8. The method of claim 6, wherein performing address translation on communication messages so that the first address for the first telephone number based device is used in the first network and the second address for the first telephone number based device is used in the second network comprises:

receiving a first communication message including the first address for the first telephone number based device; and forwarding a second communication message including the second address and the port number for the first telephone number based device.

9. The method of claim 6, wherein performing address translation on communication messages so that the first address for the first telephone number based device is used in the first network and the second address for the first telephone number based device is used in the second network comprises:

receiving a first communication message including the second address and the port number for the first telephone number based device; and forwarding a second communication message including the first address for the first telephone number based device.

10. The method of claim 1, wherein the first network is a private network, and wherein the second network is a public network.

11. An apparatus for enabling communication in an IP communication system between a first telephone number based device in a first network and a second telephone number based device in a second network, wherein the first network and the second network are IP networks, the first telephone number based device having a first address for use in the first network, the apparatus comprising:

a first network interface couplable to the first network;

a second network interface couplable to the second network; address mapping logic operably coupled to map the first address for the first telephone number based device for use in the first network to a second address for the first telephone number based device for use in the second network; and address translation logic interposed between the first network interface and the second network interface, the address translation logic operably coupled to perform address translation on communication messages exchanged between the first telephone number based device in the first network and the second telephone number based device in the second network such that the first address for the first telephone number based device is used in the first network and the second address for the first telephone number based device is used in the second network.

12. The apparatus of claim 11, further comprising an address pool including a number of addresses for use in the second network including the second address, wherein the address mapping logic is operably coupled to select the second address from the address pool.

13. The apparatus of claim 11, further comprising an address mapping database, wherein the address mapping logic is operably coupled to install an address translation entry in the address mapping database, the address translation entry mapping the first address for the first telephone number based device to the second address for the first telephone number based device.

14. The apparatus of claim 11, wherein the address translation logic is operably coupled to receive a first communication message including the first address for the first telephone number based device and forward a second communication message including the second address for the first telephone number based device.

15. The apparatus of claim 11, wherein the address translation logic is operably coupled to receive a first communication message including the second address for the first telephone number based device and forward a second communication message including the first address for the first telephone number based device.

16. The apparatus of claim 11, wherein the address mapping logic is operably coupled to allocate a port number for the first device for use in the second network.

17. The apparatus of claim 16, further comprising an address mapping database, wherein the address mapping logic is operably coupled to install an address translation entry in the address mapping database, the address translation entry mapping the first address for the first telephone number based device to the second address and the port number for the first telephone number based device.

18. The apparatus of claim 16, wherein the address translation entry is operably coupled to receive a first communication message including the first address for the first telephone number based device and forward a second communication message including the second address and the port number for the first telephone number based device.

19. The apparatus of claim 16, wherein the address translation logic is operably coupled to receive a first communication message including the second address and the port number for the first telephone number based device and forward a second communication message including the first address for the first telephone number based device.

20. The apparatus of claim 11, wherein the first network is a private network, and wherein the second network is a public network.

21. A computer program for use in a computer system for enabling communication in an IP communication system between a first telephone number based device in a first network and a second telephone number based device in a second network, wherein the first network and the second network are IP networks, the first telephone number based device having a first address for use in the first network, the computer program comprising:

address mapping logic programmed to map the first address for the first telephone number based device for use in the first network to a second address for the first telephone number based device for use in the second network; and address translation logic programmed to perform address translation on communication messages exchanged between the first telephone number based device in the first network and the second telephone number based device in the second network such that the first address for the first telephone number based device is used in the first network and the second address for the first telephone number based device is used in the second network.

22. The computer program of claim 21, wherein the address mapping logic is programmed to select the second address from an address pool including a number of addresses for use in the second network including the second address.

23. The computer program of claim 21, wherein the address mapping logic is programmed to install an address translation entry in an address mapping database, the address translation entry mapping the first address for the first telephone number based device to the second address for the first telephone number based device.

24. The computer program of claim 21, wherein the address translation logic is programmed to receive a first communication message including the first address, for the first telephone number based device and forward a second communication message including the second address for the first telephone number based device.

25. The computer program of claim 21, wherein the address translation logic is programmed to receive a first communication message including the second address for the first telephone number based device and forward a second communication message including the first address for the first telephone number based device.

26. The computer program of claim 21, wherein the address mapping logic is programmed to allocate a port number for the first device for use in the second network.

27. The computer program of claim 26, wherein the address mapping logic is programmed to install an address translation entry in an address mapping database, the address translation entry mapping the first address for the first telephone number based device to the second address and the port number for the first telephone number based device.

28. The computer program of claim 26, wherein the address translation entry is programmed to receive a first communication message including the first address for the first telephone number based device and forward a second communication message including the second address and the port number for the first telephone number based device.

29. The computer program of claim 26, wherein the address translation logic is programmed to receive a first communication message including the second address and the port number for the first telephone number based device and forward a second communication message including the first address for the first telephone number based device.

30. The computer program of claim 21, wherein the first network is a private network, and wherein the second network is a public network.

31. A method for supporting telephone number based services in an IP communication system, the method comprising:

receiving a request from a calling device including a telephone number for a called device;

selecting a gateway from at least two available gateways for communication between the calling device and the called device based upon the telephone number for the called device; and sending a response to the calling device identifying the gateway.

32. The method of claim 31, further comprising: obtaining an address for the called device from the gateway.

33. The method of claim 32, wherein the response further comprises the address for the called device.

34. The method of claim 31, further comprising:
obtain an address and port number for the called device from the gateway.

35. The method of claim 34, wherein the response further comprises the address and port number for the called device.

36. The method of claim 31, wherein determining the gateway for communication between the calling device and the called device based upon the telephone number for the called device comprises:
determining the gateway based upon an area code of the telephone number.

37. An apparatus comprising:
receiving logic operably coupled to receive a request from a calling device including a telephone number for a called device;
gateway determination logic operably coupled to select a gateway from at least two gateways for communication between the calling device and the called device based upon the telephone number for the called device; and
response logic operably coupled to send a response to the calling device identifying the gateway.

38. The apparatus of claim 37, wherein the gateway determination logic is operably coupled to obtain an address for the called device from the gateway.

39. The apparatus of claim 38, wherein the response logic is operably coupled to include the address for the called device in the response.

40. The apparatus of claim 37, wherein the gateway determination logic is operably coupled to obtain an address and port number for the called device from the gateway.

41. The apparatus of claim 40, wherein the response logic is operably coupled to include the address and port number for the called device in the response.

42. The apparatus of claim 37, wherein the gateway determination logic is operably coupled to determine the gateway for communication between the calling device and the called device based upon an area code of the telephone number.

43. A computer program for controlling a computer system, the computer program comprising:
receiving logic programmed to receive a request from a calling device including a telephone number for a called device;
gateway determination logic programmed to select a gateway from at least two available gateways for communication between the calling device and the called device based upon the telephone number for the called device; and
response logic programmed to send a response to the calling device identifying the gateway.

44. The computer program of claim 43, wherein the gateway determination logic is programmed to obtain an address for the called device from the gateway.

45. The computer program of claim 44, wherein the response logic is programmed to include the address for the called device in the response.

46. The computer program of claim 43, wherein the gateway determination logic is programmed to obtain an address and port number for the called device from the gateway.

47. The computer program of claim 46, wherein the response logic is programmed to include the address and port number for the called device in the response.

48. The computer program of claim 43, wherein the gateway determination logic is programmed to determine the gateway for communication between the calling device and the called device based upon an area code of the telephone number.

49. A method for establishing a communication connection by a first telephone number based device in a first network to a second telephone number based device in a second network, wherein the first network and second network are Internet Protocol (IP) networks, the second telephone number based device having a first address for use in the second network, the method comprising:
selecting a gateway from at least two available gateways for communicating with the second telephone number based device based on a telephone number of the second telephone number based device;
obtaining a second address for the second telephone number based device for use in the first network; and
establishing a connection to the second telephone number based device through the gateway using the second address for the second telephone number based device.

50. The method of claim 49, wherein determining the gateway for communicating with the second telephone number based device comprises:
sending a request to a gatekeeper including a telephone number for the second telephone number based device; and
receiving a response from the gatekeeper indicating the gateway.

51. The method of claim 50, wherein obtaining the second address for the second telephone number based device for use in the first network comprises:
receiving the second address from the gatekeeper in the response.

52. The method of claim 51, wherein obtaining the second address for the second telephone number based device for use in the first network further comprises:
receiving a port number for the second telephone number based device from the gatekeeper in the response.

53. The method of claim 49, wherein obtaining the second address for the second telephone number based device for use in the first network comprises:
sending a request to the gateway including a telephone number for the second telephone number based device; and
receiving a response from the gateway including the second address.

54. The method of claim 53, wherein the response further comprises a port number for the second telephone number based device.

55. A telephone number based device for use in a first network of an IP communication system having a second telephone number based device in a second network, wherein the second network is an IP network, the second telephone number based device having a first address for use in the second network, the telephone number based device comprising:
gateway determination logic operably coupled to the select a gateway from at least two available gateways for communicating with the second telephone number based device;
address determination logic operably coupled to obtain a second address for the second telephone number based device for use in the first network; and
connection establishment logic operably coupled to establish a connection to the second telephone number based device through the gateway using the second address for the second telephone number based device.

56. The telephone number based device of claim 55, wherein the gateway determination logic is operably coupled to send a request to a gatekeeper including a telephone number for the second telephone number based device and receive receiving a response from the gatekeeper indicating the gateway.

57. The telephone number based device of claim 56, wherein the address determination logic is operably coupled to obtain the second address from the gatekeeper in the response.

58. The telephone number based device of claim 57, wherein the address determination logic is operably coupled to obtain a port number for the second telephone number based device from the gatekeeper in the response.

59. The telephone number based device of claim 55, wherein the address determination logic is operably coupled to send a request to the gateway including a telephone number for the second telephone number based device and receive a response from the gateway including the second address.

60. The telephone number based device of claim 59, wherein the address determination logic is operably coupled to receive a port number for the second telephone number based device in the response.

61. A computer program for controlling first telephone number based device for use in a first network of an IP communication system having a second telephone number based device in a second network, wherein the second network is an IP network the second telephone number based device having a first address for use in the second network, the computer program comprising:

gateway determination logic programmed to select a gateway from at least two available gateways for communicating with the second telephone number based device;

address determination logic programmed to obtain a second address for the second telephone number based device for use in the first network; and connection establishment logic programmed to establish a connection to the second telephone number based device through the gateway using the second address for the second telephone number based device.

62. The telephone number based device of claim 61, wherein the gateway determination logic is programmed to send a request to a gatekeeper including a telephone number for the second telephone number based device and receive receiving a response from the gatekeeper indicating the gateway.

63. The telephone number based device of claim 62, wherein the address determination logic is programmed to obtain the second address from the gatekeeper in the response.

64. The telephone number based device of claim 63, wherein the address determination logic is programmed to obtain a port number for the second telephone number based device from the gatekeeper in the response.

65. The telephone number based device of claim 61, wherein the address determination logic is programmed to send a request to the gateway including a telephone number for the second telephone number based device and receive a response from the gateway including the second address.

66. The telephone number based device of claim 65, wherein the address determination logic is programmed to receive a port number for the second telephone number based device in the response.

67. A communication system comprising a gateway for enabling communication between a first telephone number based device in a first network and a second telephone number based device in a second network, wherein the first network and the second network are Internet Protocol (IP) networks, the first telephone number based device having a first address for use in the first network, the gateway operably coupled to allocate a second address for the first telephone number based device for use in the second network and to perform address translation on communication messages exchanged between the first telephone number based device in the first network and the second telephone number based device in the second network such that the first address for the first telephone number based device is used in the first network and the second address for the first telephone number based device is used in the second network.

68. The communication system of claim 67, wherein the gateway is operably coupled to allocate a port number for the first telephone number based device for use in the second network and to perform address translation on communication messages exchanged between the first telephone number based device in the first network and the second telephone number based device in the second network such that the first address for the first telephone number based device is used in the first network and the second address and port number for the first telephone number based device are used in the second network.

69. The communication system of claim 67, wherein the first and second telephone number based devices are Voice-over-IP (VoIP) devices, and wherein the communication messages are VoIP communication messages.

70. The communication system of claim 67, wherein the first and second telephone number based devices are Fax-over-IP devices, and wherein the communication messages are Fax-over-IP communication messages.

71. The communication system of claim 67, wherein the first and second telephone number based devices are paging devices, and wherein the communication messages are paging communication messages.

* * * * *

UNITED STATES PATENT AND TRADEMARK OFFICE
CERTIFICATE OF CORRECTION

| | | |
|---|---|---|
| PATENT NO. | : 6,772,210 B1 | Page 1 of 1 |
| APPLICATION NO. | : 09/609964 | |
| DATED | : August 3, 2004 | |
| INVENTOR(S) | : Edholm | |

It is certified that error appears in the above-identified patent and that said Letters Patent is hereby corrected as shown below:

In the Claims

Column 11, line 61
  replace "fist telephone"
  with --first telephone--

Signed and Sealed this
Sixteenth Day of December, 2014

Michelle K. Lee
*Deputy Director of the United States Patent and Trademark Office*